United States Patent [19]

Paetow

[11] 4,342,217
[45] Aug. 3, 1982

[54] STRAIN GAGE PICK-UP AND METHOD FOR ADJUSTING SUCH STRAIN GAGE PICK-UP

[75] Inventor: Jürgen Paetow, Darmstadt, Fed. Rep. of Germany

[73] Assignee: Hottinger Baldwin Measurements, Inc., Framingham, Mass.

[21] Appl. No.: 170,019

[22] Filed: Jul. 18, 1980

[30] Foreign Application Priority Data

Aug. 20, 1979 [DE] Fed. Rep. of Germany ....... 2933676

[51] Int. Cl.³ ............................................. G01L 25/00
[52] U.S. Cl. ............................................. 73/1 B; 338/2
[58] Field of Search .................. 338/2, 3, 4, 5, 195, 338/325; 73/1 B

[56] References Cited

U.S. PATENT DOCUMENTS

| | | | |
|---|---|---|---|
| 2,693,023 | 11/1954 | Kerridge et al. | 338/195 |
| 3,094,678 | 6/1963 | Eisler | 338/195 |
| 3,327,271 | 6/1967 | Hornig | 338/2 |
| 3,697,918 | 10/1972 | Orth et al. | 338/3 |
| 3,737,827 | 6/1973 | Paetow | 338/2 |
| 4,146,957 | 4/1979 | Toenshoff | 338/195 |
| 4,196,411 | 4/1980 | Kaufman | 338/325 |
| 4,217,785 | 8/1980 | Spoor | 73/1 B |

FOREIGN PATENT DOCUMENTS 217506 10/1973 U.S.S.R. ............................... 338/195

Primary Examiner—Anthony V. Ciarlante
Attorney, Agent, or Firm—W. G. Fasse; D. F. Gould

[57] ABSTRACT

Off-center load applications to strain gage pick-ups or transducers are substantially compensated by reducing the off-center load application sensitivity of such transducers. This is accomplished by providing the strain gage of the transducer with additional strain gage components which are so located that the effective position of the strain gage device is shifted on its supporting spring body. Thus, although the strain gage device remains physically in position on the supporting spring body, the center of the coordinate system which defines the ordinate of the system can be shifted in any one of the four directions of the system. If the spring body is equipped with a single strain gage only then the point of load application should lie upon the ordinate of the coordinate system what can be achieved by that shifting. If the spring body is equipped with more than one strain gage then the symmetry of the whole strain gage circuitry can be improved by shifting of the respective strain gage coordinate systems.

9 Claims, 5 Drawing Figures

STRAIN GAGE PICK-UP AND METHOD FOR ADJUSTING SUCH STRAIN GAGE PICK-UP

BACKGROUND OF THE INVENTION

The invention relates to measuring pick-ups or transducers, especially strain gage force transducers and to a method for adjusting such transducers having at least one strain gage applied to a spring body. The adjustment is accomplished by activating further strain gage components. The invention also relates to foil strain gages suitable for use in the present adjustment method.

U.S. Pat. No. 3,737,827 describes, for example, an adjustment method for strain gages. Particularly FIG. 4 of said U.S. patent and the respective description of FIG. 4 shows that creep of a strain gage may be adjusted in a strain gage transducer of the type mentioned above by providing the strain gage with additional creep compensating strain gage components which form loops in the grid structure of the strain gage. These additional strain gage loops are connected for activation to corresponding terminals of the strain gage.

A measuring transducer or pick-up has been suggested in which strain gage arrangement may be adjusted relative to creep, relative to its resistance, as well as relative to torque load errors in that further strain gage components connected to the strain gage arrangement may be activated by opening conductor sections which prior to such opening short circuit the additional strain gage components.

It is also generally known that measuring pick-ups or transducers having at least one strain gage applied to a spring body, especially when force transducers are involved, are subject to errors resulting from nonideal, off-center load applications. These errors result when the force to be measured is applied to the transducer at a point off-center relative to an optimal point of load application. Such off-center load applications influence the deformation of the spring body in a manner which is hard to control. Thus, even small off-center load applications relative to the optimal point of load application, result in substantial bending moments in an axially loaded, cylindrical measuring rod, whereby a correspondingly complex deformation characteristic is caused.

Further, additional output errors may result because of force components present in addition to the force component effective in the optimal measuring direction or rather effective in the optimal point of load application. Such additional force components also cause loads in the spring body of the transducer, thereby influencing the output reading. In theory such errors are compensated by multiple strain gage arrangements on the spring body and by interconnecting such multiple strain gages in a Wheatstone bridge circuit. However, practical experience has shown that such theoretical compensation cannot be achieved completely so that erroneous output readings as a result of error loading must be taken into consideration at least to a certain extent. In order to keep these error causing effects as small as possible, attempts have been made to eliminate erroneous loading, for example, by carefully locating the load application point in the spring body of the transducer. However, this approach is subject to physical and economical limitations.

OBJECTS OF THE INVENTION

In view of the above it is the aim of the invention to achieve the following objects singly or in combination:

to provide a method for adjusting strain gage measuring transducers for the purpose of reducing the sensitivity of the measuring transducer relative to a nonideal, off-center load application;

to construct strain gages suitable for performing such adjustment;

to construct strain gages in such a manner that their symmetry, or rather their effective symmetry relative to an optimal point of load application, is increased; and to provide strain gage arrangements with secondary strain gage components in such a manner that their activation will adjust the effective locations of the strain gage arrangement relative to an optimal point of load application.

SUMMARY OF THE INVENTION

The invention is based on the recognition that the theoretic compensation of errors by way of multiple arrangements of strain gages can be accomplished only if the geometry of the spring body and of the strain gage arrangement is absolutely symmetrical relative to the point of load application. However, in practice such symmetry can never be completely achieved for many reasons. For example, in applying the strain gage arrangement to the supporting spring body it is not possible to place the strain gage arrangement exactly into the same location each time. Thus, the above mentioned errors resulting due to off-center load applications, or rather, due to the off-center load application sensitivity must be taken into account to a certain extent. Thus, the invention increases the internal symmetry of the transducer.

According to the method of the invention the adjustment is accomplished in that the origin or center of the grid geometry of the effective portion of the strain gage is shifted relative to the spring body on which the strain gage is supported, by predetermined amounts. An especially simple and very effective adjustment is possible if the effective shifting of said center of the grid geometry may be done in the longitudinal direction as well as in a direction extending across the longitudinal direction of the strain gage.

According to the invention there is further provided a strain gage for performing the present method which is equipped with strain gage components operatively connected to the main strain gage and located displaced in the strain direction relative to the main strain gage. The additional strain gage components are activatable in a selected manner. The present method may be practiced especially effectively if the additional strain gage components are arranged relative to the main strain gage in the strain direction and in a direction across the strain direction.

An especially fine adjustment or tuning becomes possible if the activatable additional strain gage components extend substantially at right angles to the outer edges of the main strain gage and have a configuration which affects the main strain gage after adjustment. For example, such configuration may be a U-shape. This type of arrangement provides an especially large number of possibilities for the shifting of the effective points of load application relative to the grid geometry of the strain gage arrangement, if the U-shaped components have a meandering shape and if these meandering shapes are so arranged that the outer legs of the main strain gage extend approximately along the center lines of the meandering shapes.

BRIEF FIGURE DESCRIPTION

In order that the invention may be clearly understood, it will now be described, by way of example, with reference to the accompanying drawings, wherein.

Figure 4:
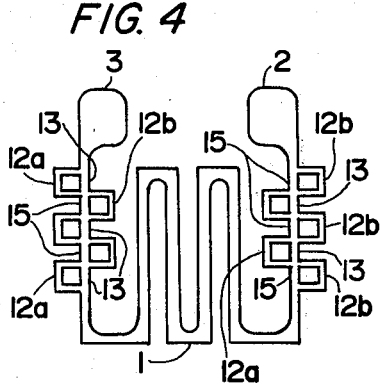
Figure 5:
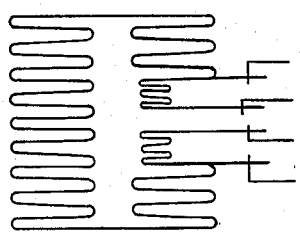

FIG. 4 illustrates a strain gage in which the U-shaped adjustable strain gage components have a meandering shape so arranged that the outer edges or legs of the main strain gage extend approximately through the center of the meandering loops; and FIG. 5 corresponds substantially to FIG. 4 of U.S. Pat. No. 3,737,827 showing a strain gage by means of which the method according to the invention may be practiced.

DETAILED DESCRIPTION OF PREFERRED EXAMPLE EMBODIMENTS AND OF THE BEST MODE OF THE INVENTION

Figure 1:
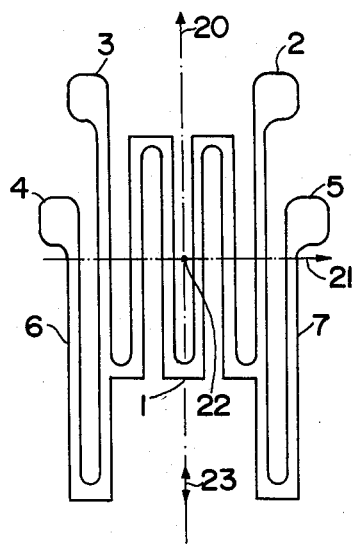
FIG. 1 shows a strain gage arrangement according to the invention constructed so that the center of its grid geometry may be shifted in the direction in which the strain is effective, namely, along the ordinate of a rectangular coordinate system.

FIG. 1 shows a strain gage 1 with meandering loops forming a grid configuration between terminals 2 and 3. As shown, the main strain gage 1 is centered with its grid geometry relative to a rectangular coordinate system having an ordinate 20, an abscissa 21, and an origin 22. The strain is effective in the direction of the ordinate 20 as indicated by the double arrow 23.

If there is only one strain gage upon the spring body the ideal point of load application should lie upon ordinate 20 in order to achieve symmetric loading of the two halves of the strain gage. If there are two strain gages upon the spring body being connected to a half bridge circuit the point of load application must lie upon the ideal straight line exactly in the midst between the two strain gages. The same is true with four strain gages upon the spring body being connected to a full bridge circuit. Here too the strain gages must be arranged in a symmetric configuration with respect to the load axis. Same symmetry requirements relate to the transverse axis, the abscissa 21, of the strain gages so that an overall symmetry is given between the coordinate origins 22 of the strain gages and the point of load application to the spring body.

Incidentally, the spring body to which the strain gage 1 is applied, is not shown in the figures for simplicity's sake.

According to the invention the main strain gage 1 is connected with additional strain gage components 6 and 7 provided with terminals 4 and 5. These secondary strain gage components are displaced in the longitudinal direction of the ordinate relative to the main strain gage 1. Thus, the additional components 6 and 7 extend beyond the strain gage 1 intended for the measuring proper. Normally, the terminals 2 and 3 are soldered to the outer transducer terminals not shown. However, if it happens that the measured value transducer is assymetric in the longitudinal direction of the ordinate, and the inner symmetry would be increased by a shifting of the center of the grid geometry in the longitudinal direction, for example, downwardly in FIG. 1, then the additional strain gage components 6 and 7 are activated. This is done by switching over or resoldering of the outer terminals of the strain gage to the terminals 4 and 5. By this activation according to the invention of the additional strain gage components 6 and 7 the center of the measuring strain gage grid is shifted, for example, downwardly, whereby the inner symmetry of the measured value transducer is increased and thus the sensitivity relative to off-center load applications is reduced. If desired, the additional strain gage components 6 and 7 may have relatively numerous loops and they may include several additional connecting terminals so that by selecting suitable connecting terminals the center of the grid geometry may be shifted in steps by predetermined amounts.

Figure 2:
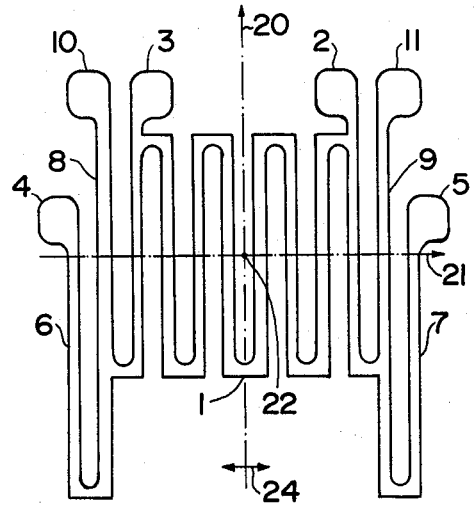
FIG. 2 illustrates a strain gage arrangement in which the center of the grid geometry may be shifted in the direction of the strain and in a direction extending perpendicularly to the strain direction, that is, in the direction of the ordinate and in the direction of the abscissa.

FIG. 2 shows an embodiment similar to that of FIG. 1, however, with the additional feature that the center of the grid geometry is displaceable in the longitudinal direction as indicated by the double arrow 23 in FIG. 1 and in the horizontal direction indicated by the double arrow 24 extending across the longitudinal direction.

In FIG. 2 again the main strain gage arrangement 1 is provided with two additional strain gage components 6 and 7 which, when activated, cause a shift of the center of the grid geometry in the longitudinal direction of the strain gage, the longitudinal direction being the direction of the ordinate 20. Thus, when the connecting terminals 2, 3, or 4, 5 are activated, the embodiment of FIG. 2 does not provide any difference relative to the embodiment of FIG. 1. However, in FIG. 2 additional strain gage components 8 and 9 are arranged between the main strain gage 1 and the additional strain gage components 6 and 7. The additional components 8 and 9 are displaced in the cross direction indicated by the abscissa 21 relative to the main strain gage 1. The additional components 8 and 9 may be activated by connecting the terminals 10 and 11 with the outer terminals of the strain gage not shown.

If the connecting terminals 3 and 11 are connected in FIG. 2, the additional, secondary strain gage component 9 is activated whereby the center 22 of the grid configuration of the main strain gage 1 is shifted toward the right in FIG. 2. On the other hand, connecting the terminal points 2 and 4 results in shifting the center toward the left and downwardly relative to its original position coinciding with the origin 22 of the coordinate system. A shifting to the right and downwardly is accomplished by connecting the terminals 3 and 5 to the outer terminals of the strain gage transducer.

Within certain limits, it is possible to accomplish a lateral shifting of the center of the grid geometry also in the embodiment shown in FIG. 1, whereby, however, a pure lateral shifting is not possible, but rather, a combined shifting for example, by activating only the main strain gage 1 and the secondary strain gage component 7 by connecting the terminals 3 and 5 with the outer terminals not shown. In that instance, in FIG. 1 a shift is accomplished to the right and downwardly.

Figure 3:
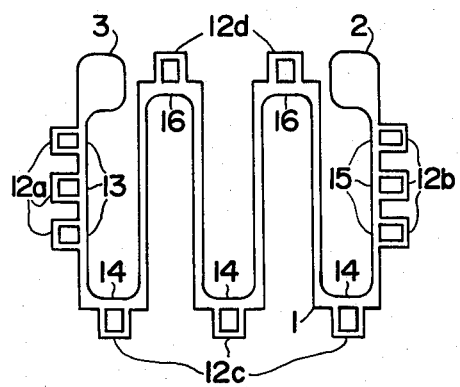
FIG. 3 illustrates a strain gage with U-shaped activatable strain gage components extending substantially perpendicularly to the outer edges of the main strain gage.

FIG. 3 shows an embodiment in which the main strain gage 1 is provided with secondary strain gage components 12a, 12b, 12c, and 12d. These secondary strain gage components have, for example, a U-shape and are initially shunted by sections of the legs forming the main strain gage. Preferably, the secondary strain gage components are connected to the outwardly facing legs of the main strain gage. Initially the secondary strain gage components 12a are shunted by sections 13 of the left outer leg of the strain gage 1. The secondary strain gage components 12b, are connected to the outwardly facing edge of the right hand leg of the main foil strain gage 1 and are shunted by sections 15 of said right hand outer leg. The secondary strain gage components 12c are connected to the lower, horizontal legs of the main strain gage and are initially shunted by sections 14. The secondary strain gage components 12d are connected to the upper horizontal legs of the main strain gage 1 and are initially shunted by sections 16.

By severing any one or a plurality of the sections 13, 14, 15, and/or 16, as taught by the invention, the respective secondary strain gage components are activated for the locating of the center of the grid geometry of the primary or main strain gage 1. Thus, if for example, the sections 13 are severed individually or in combination, the secondary strain gage components 12a are respectively activated and the effective center of the grid geometry is shifted toward the left. Similarly, by severing any one or all of the sections 14, the secondary strain gage components 12c are activating, whereby the effective center is shifted downwardly. Severing of the sections 15 results in the activation of the components 12b and in a shift toward the right while severing sections 16 results in a shift upwardly as viewed in FIG. 3.

In the embodiment of FIG. 3 the secondary strain gage components 12a, 12b, 12c, and 12d are shaped so that the sides form approximately a square together with the respective shunting sections. However, it is possible that the secondary strain gage components have other shapes, for example, they may be rounded or they may have a trapeze type shape or they may have a sawtooth shape. In any event, the shape may be adapted to the particular strain or expansion condition to which the spring of the measuring transducer will be exposed so that a more advantageous or rather, more effective shifting of the center, as described, may be accomplished.

FIG. 4 illustrates an embodiment similar to that of FIG. 3, however, the embodiment of FIG. 4 does not include any secondary strain gage components along the upper and lower horizontal legs of the main strain gage 1. It has been found, that the exact position of the secondary strain gage components having, for example, a U-shape relative to the grid geometry of the main strain gage is not critical. In FIG. 4 the U-shaped secondary strain gage components 12a and 12b are arranged relative to the left and right outer leg of the main strain gage 1 so as to meander across these legs, whereby the latter extend substantially centrally and longitudinally through the meandering secondary strain gage components 12a and 12b. Again, it is not essential that these outer legs of the main strain gage extend exactly centrally through the meandering secondary components. Severing the sections 13 results in a shift toward the left. Severing the sections 15 results in a shift toward the right. The embodiment of FIG. 4 permits a wide range of adjustments which may be rather small in fine steps or a large adjustment may be accomplished depending on how many sections 13, 15 are severed. This wide range of adjustments is possible because the meandering shape permits the arrangement of a substantial number of secondary strain gage components.

FIG. 5 shows a prior art strain gage corresponding to FIG. 4 of the above mentioned U.S. Pat. No. 3,737,827 which may be utilized in performing the method according to the present invention for shifting the center of the grid geometry of the main strain gage relative to the supporting spring body by predetermined amounts.

For example, if the outer right connecting point or terminal and the outer left connecting point or terminal are electrically connected to the outer input terminals or conduits, the center of the grid geometry remains unchanged. However, if, for example, the outer right terminal and the middle left terminal are connected to the outer terminals of the transducer, the center of the grid configurations is shifted toward the right.

Although the invention has been described with reference to specific example embodiments, it will be appreciated, that it is intended to cover all modifications and equivalents within the scope of the appended claims.

What is claimed is:

1. A method for adjusting the effective position of a main strain gage relative to a given rectangular coordinate system on its supporting spring body forming a strain gage transducer, comprising the following steps: providing said main strain gage with secondary strain gage components located in predetermined positions relative to said main strain gage and relative to said given rectangular coordinate system, and selectively using by adding or subtracting specific ones of said secondary strain gage components to or from the main strain gage so that the effective center of the grid geometry of said main strain gage is shifted relative to said given rectangular coordinate system and thus relative to said spring body by predetermined amounts which are sufficiently small for compensating off-center load applications.

2. The method of claim 1, wherein said secondary strain gage components are located in such positions relative to said main strain gage that selective utilization of said secondary strain gage components shifts the effective center of grid geometry of the main strain gage substantially in the longitudinal direction of the main strain gage.

3. The method of claim 1, wherein said secondary strain gage components are located in such positions relative to said main strain gage that selective utilization of said secondary strain gage components shifts the effective center of grid geometry of the main strain gage substantially in a direction extending across or perpendicularly to the longitudinal direction of the main strain gage.

4. A strain gage transducer, comprising spring body means, main strain gage means operatively secured to said spring body means, secondary strain gage components operatively connected to said main strain gage means in such positions that the secondary strain gage components are displaced relative to the main strain gage in the strain direction in which the strain is effective to expand the main strain gage by adding or subtracting certain ones of said secondary strain gage components to or from the main strain gage for shifting the effective center of a grid geometry of said main strain gage means on said spring body means substantially in said strain direction and relative to a rectangular coordinate system by predetermined amounts which are sufficiently small for compensating off-center load application, said transducer further comprising additional secondary strain gage components operatively connected to said main strain gage means in such positions that the additional secondary strain gage components are displaced relative to the main strain gage means in a lateral direction extending across or perpendicularly to said direction in which the strain is effective for expanding the main strain gage means, whereby said effective center of the grid geometry of said main strain gage may also be shifted on said spring body means substantially in said lateral direction.

5. A strain gage transducer, comprising spring body means, main strain gage means operatively secured to said spring body means, said main strain gage means having outwardly facing edges, secondary strain gage components operatively connected to said outwardly facing edges of said main strain gage means, said secondary strain gage components having such a shape that the secondary strain gage components extend substantially across or perpendicularly to the direction defined by the respective main strain gage means, said main strain gage means constituting shunting means for said secondary strain gage components for selectively adding or subtracting any one of said secondary strain gage components to or from said main strain gage means by interrupting any one secondary strain gage component or said shunting means to shift the effective center of the grid geometry of said main strain gage means out of its initial position and relative to a given rectangular coordinate system by predetermined amounts which are sufficiently small for compensating off-center load applications.

6. The strain gage transducer of claim 5, wherein said secondary strain gage components have substantially a U-shape whereby the legs of the U-shapes extend substantially perpendicularly to said outwardly facing edges of the main strain gage means.

7. The strain gage transducer of claim 5, wherein said secondary strain gage components have a meandering shape.

8. The strain gage transducer of claim 7, wherein said main strain gage means have legs extending substantially centrally and lengthwise through said meandering shape of said secondary strain gage components.

9. The strain gage transducer of claim 8, wherein said legs of said main strain gage means have laterally outer legs which extend substantially centrally through said meandering shape of said secondary strain gage components.

* * * * *